(12) United States Patent
Zhao

(10) Patent No.: US 11,815,760 B2
(45) Date of Patent: Nov. 14, 2023

(54) DISPLAY PANEL AND DISPLAY DEVICE

(71) Applicant: TCL CHINA STAR OPTOELECTRONICS TECHNOLOGY CO., LTD., Shenzhen (CN)

(72) Inventor: Yongchao Zhao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 493 days.

(21) Appl. No.: 17/047,673

(22) PCT Filed: Jul. 2, 2020

(86) PCT No.: PCT/CN2020/099839
§ 371 (c)(1),
(2) Date: Oct. 14, 2020

(87) PCT Pub. No.: WO2021/227216
PCT Pub. Date: Nov. 18, 2021

(65) Prior Publication Data
US 2023/0111716 A1 Apr. 13, 2023

(30) Foreign Application Priority Data

May 14, 2020 (CN) .......................... 202010407586.9

(51) Int. Cl.
*G02F 1/1335* (2006.01)
*G02B 1/111* (2015.01)
*G02F 1/1343* (2006.01)

(52) U.S. Cl.
CPC ........ *G02F 1/133531* (2021.01); *G02B 1/111* (2013.01); *G02F 1/13439* (2013.01); *G02F 1/133512* (2013.01)

(58) Field of Classification Search
CPC .......... G02F 2201/38; G02F 1/133502; G02B 5/0278; G02B 1/111; G02B 5/0242; G02B 1/11
See application file for complete search history.

(56) References Cited

U.S. PATENT DOCUMENTS

2005/0057708 A1* 3/2005 Kuo ................... G02F 1/133514
349/106
2008/0151152 A1* 6/2008 Yang ................. G02F 1/133502
349/137
(Continued)

FOREIGN PATENT DOCUMENTS

CN 1532567 A 9/2004
CN 101299106 A 11/2008
(Continued)

*Primary Examiner* — Shan Liu
(74) *Attorney, Agent, or Firm* — PV IP PC; Wei Te Chung; Zhigang Ma

(57) ABSTRACT

A display panel and a display device are provided. The display panel includes an array substrate, an optical function layer, and an anti-reflection layer. The optical function layer and the anti-reflection layer are located on the array substrate, material of the anti-reflection layer includes a sulfur-containing material, and a refractive index of the anti-reflection layer is between refractive indexes of two film layers adjacent to the anti-reflection layer. Since the refractive index of the anti-reflection layer is between the refractive indexes of the two film layers adjacent to the anti-reflection layer, reflection of external light on the display panel is reduced, thereby improving a display effect of the display panel.

15 Claims, 3 Drawing Sheets

(56) References Cited

U.S. PATENT DOCUMENTS

2010/0271699 A1* 10/2010 Chang .................... G02B 1/111
    524/786
2013/0280656 A1* 10/2013 Lowes .................... G03F 7/091
    430/311
2017/0146858 A1* 5/2017 Liu ...................... G02F 1/13725

FOREIGN PATENT DOCUMENTS

| CN | 102891261 A | | 1/2013 |
|---|---|---|---|
| CN | 203232226 U | * | 10/2013 |
| CN | 203232226 U | | 10/2013 |
| CN | 106773285 A | | 5/2017 |
| CN | 110928037 A | | 3/2020 |
| WO | 2013100234 A1 | | 7/2013 |

* cited by examiner

DISPLAY PANEL AND DISPLAY DEVICE

This application is a Notional Phase of PCT Patent Application No. PCT/CN2020/099839 having international filing date of Jul. 2, 2020, which claims priority to Chinese Patent Application with the application No. 202010407586.9 filed on May 14, 2020 with the National Intellectual Property Administration, the disclosure of which is incorporated by reference in the present application in its entirety.

FIELD OF INVENTION

The present disclosure relates to the field of display technology, and particularly, to a display panel and a display device.

BACKGROUND OF INVENTION

With increase of people's requirement for display panels, an important development direction in the display field is how to improve a display effect of the display panels.

For the conventional display panels, in outdoor or high brightness environments, since external light is reflected, visibility of the display images is apt to be affected, thus affecting the display effect of the display panels.

Therefore, a new display panel and display device are urgently required to solve the above-mentioned technical problems.

SUMMARY OF INVENTION

Technical Problem

The present disclosure provides a display panel and a display device to solve problems that reflection of external light on conventional display panels causes visibility of display images to be reduced and affects a display effect.

Technical Solutions

The present disclosure provides a display panel including an array substrate, an optical function layer, and an anti-reflection layer;
  wherein the optical function layer and the anti-reflection layer are located on the array substrate;
  wherein material of the anti-reflection layer includes a sulfur-containing material; and
  wherein a refractive index of the anti-reflection layer is between refractive indexes of two film layers adjacent to the anti-reflection layer.

In the display panel provided by the present disclosure, the optical function layer includes a second base substrate, a polarizing layer located on a side of the second base substrate away from the array substrate, and a second common electrode layer located on a side of the second base substrate close to the array substrate; and
  wherein the anti-reflection layer is located between the polarizing layer and the array substrate.

In the display panel provided by the present disclosure, the anti-reflection layer is located between the polarizing layer and the second base substrate, or the anti-reflection layer and the second base substrate are disposed on the same layer.

In the display panel provided by the present disclosure, the anti-reflection layer is located between the second base substrate and the second common electrode layer, or the anti-reflection layer and the second common electrode layer are disposed on the same layer.

In the display panel provided by the present disclosure, the display panel further includes a liquid crystal layer located between the array substrate and the second common electrode layer, a first alignment layer located on a side of the liquid crystal layer close to the array substrate, and a second alignment layer located on a side of the liquid crystal layer close to the second common electrode layer; and
  wherein the anti-reflection layer is located in the first alignment layer and/or the second alignment layer, or the anti-reflection layer is proximately disposed on at least one side of the first alignment layer and/or the second alignment layer.

In the display panel provided by the present disclosure, the anti-reflection layer and the first alignment layer are disposed on the same layer, or the anti-reflection layer is located between the first alignment layer and the array substrate.

In the display panel provided by the present disclosure, the anti-reflection layer and the second alignment layer are disposed on the same layer, or the anti-reflection layer is located between the second alignment layer and the second common electrode layer.

In the display panel provided by the present disclosure, the refractive index of the anti-reflection layer is from 1.6 to 1.8.

In the display panel provided by the present disclosure, a mass fraction of the sulfur-containing material of the anti-reflection layer is from 0.5% to 5%.

In the display panel provided by the present disclosure, the material of the anti-reflection layer is polyimide doped with the sulfur-containing material.

In the display panel provided by the present disclosure, the refractive index of a side of the anti-reflection layer close to the second common electrode layer is greater than the refractive index of a side of the anti-reflection layer close to the array substrate.

In the display panel provided by the present disclosure, the refractive index of the anti-reflection layer gradually increases in a direction from the array substrate to the second common electrode.

In the display panel provided by the present disclosure, the display panel further includes a black matrix located on the array substrate or the optical function layer; and
  wherein an orthographic projection of the anti-reflection layer projected on the black matrix is within the black matrix.

In the display panel provided by the present disclosure, the display panel further includes a light-emitting layer located between the array substrate and the second common electrode layer; and
  wherein the anti-reflection layer is located between the light-emitting layer and the second common electrode layer.

In the display panel provided by the present disclosure, the sulfur-containing material includes sulfur-containing nanoparticles.

In the display panel provided by the present disclosure, the sulfur-containing material is zinc sulfide nanoparticles.

In the display panel provided by the present disclosure, the sulfur-containing material includes a sulfur-containing polymer.

In the display panel provided by the present disclosure, the sulfur-containing material is an optical resin having a sulfur-containing group.

In the display panel provided by the present disclosure, the sulfur-containing group includes at least one of thioether, sulfone, or sulfur heterocycle.

The present disclosure further provides a display device including a display panel, and the display panel includes an array substrate, an optical function layer, and an anti-reflection layer;
  wherein the optical function layer and the anti-reflection layer are located on the array substrate;
  wherein material of the anti-reflection layer includes a sulfur-containing material; and
  wherein a refractive index of the anti-reflection layer is between refractive indexes of two film layers adjacent to the anti-reflection layer.

Advantageous Effects

In the present disclosure, the anti-reflection layer made of the sulfur-containing material is disposed, and the refractive index of the anti-reflection layer is between the refractive indexes of the two film layers adjacent to the anti-reflection layer, thereby reducing the reflection of external light on the display panel and improving the display effect of the display panel.

DESCRIPTION OF DRAWINGS

By illustrating specific implementations of the present disclosure in conjunction with accompanying drawings in detail below, technical solutions and other advantageous effects of the present disclosure are clear.

DETAILED DESCRIPTION OF PREFERRED EMBODIMENTS

Figure 1:
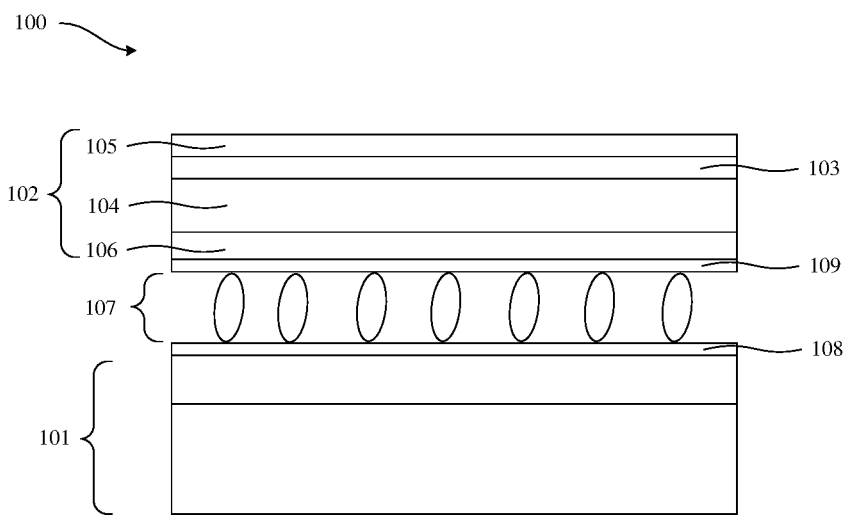
FIG. 1 is a schematic view of a first structure of a display panel of the present disclosure.

The present disclosure provided a display panel and a display device. In order to make purposes, technical solutions, and effects of the present disclosure clear and definite, the present disclosure is further illustrated in detail with reference to drawings and embodiments as follows. It should be understood that the specific embodiments described herein are only used to interpret the present disclosure and not to limit the present disclosure.

For conventional display panels, in outdoor or high brightness environments, since external light is reflected, visibility of display images is apt to be affected, thus affecting a display effect of the display panels. Based on this reason, the present disclosure provides a display panel.

Referring to FIGS. 1 to 5, the display panel 100 includes an array substrate 101, an optical function layer 102, and an anti-reflection layer 103. The optical function layer 102 and the anti-reflection layer 103 are located on the array substrate 101, and material of the anti-reflection layer 103 includes a sulfur-containing material.

Moreover, a refractive index of the anti-reflection layer 103 is between refractive indexes of two film layers adjacent to the anti-reflection layer.

In the embodiment, the display panel 100 may be a liquid crystal display panel, or may also be an organic light-emitting diode (OLED) display panel or other types of display panels, which are not specifically limited herein.

In the embodiment, the array substrate 101 may include a first base substrate and a driving circuit layer.

Moreover, the first base substrate may be a rigid base substrate, or may also be a flexible base substrate. When the first base substrate is the rigid base substrate, the first base substrate may be made of glass, quartz, and the like. When the first base substrate is the flexible base substrate, the first base substrate may be made of polyimide and the like.

In the embodiment, the sulfur-containing material included in the material of the anti-reflection layer 103 may be a sulfur-containing polymer, or may also be sulfur-containing particles or other sulfur-containing materials that modulate the refractive index of the anti-reflection layer 103, which are not specifically limited herein.

When the sulfur-containing material included in the material of the anti-reflection layer 103 is the sulfur-containing polymer, the sulfur-containing material may be an optical resin having thioether, sulfone, sulfur heterocycle, or other sulfur-containing groups, or other sulfur-containing polymer materials, which are not specifically limited herein. The optical resin may be polyimide or polyurethane.

When the sulfur-containing material included in the material of the anti-reflection layer 103 is the sulfur-containing nanoparticles, the sulfur-containing material may be metal nanoparticles with sulfur atoms as surface ligands, metal sulfide nanoparticles, or other types of sulfur-containing nanoparticles, which are not specifically limited herein.

When the sulfur-containing material is the metal sulfide nanoparticles, the sulfur-containing material may be zinc sulfide nanoparticles.

In the present disclosure, the anti-reflection layer 103 made of the sulfur-containing material is disposed, and the refractive index of the anti-reflection layer 103 is between the refractive indexes of the two film layers adjacent to the anti-reflection layer 103, thereby reducing the reflection of the external light on the display panel 100 and improving the display effect of the display panel 100.

The technical solutions of the present disclosure are described in conjunction with the specific embodiments.

A First Embodiment

Referring to FIG. 1, the optical function layer 102 includes a second base substrate 104, a polarizing layer 105 located on a side of the second base substrate 104 away from the array substrate 101, and a second common electrode layer 106 located on a side of the second base substrate 104 close to the array substrate 101.

The anti-reflection layer 103 is located between the polarizing layer 105 and the array substrate 101.

In the embodiment, the second base substrate 104 may be the rigid base substrate, or may also be the flexible base substrate. When the second base substrate 104 is the rigid base substrate, the second base substrate 104 may be made of glass, quartz, and the like. When the second base substrate 104 is the flexible base substrate, the second base substrate 104 may be made of polyimide and the like.

In the embodiment, material of the second common electrode layer 106 may be at least one of Indium tin oxide or other transparent conductive materials.

In the embodiment, the anti-reflection layer 103 may be located between the polarizing layer 105 and the second base substrate 104, the anti-reflection layer 103 may be located between the second base substrate 104 and the second common electrode layer 106, or the anti-reflection layer 103 may be located between the second common electrode layer 106 and the array substrate 101.

In the embodiment, the anti-reflection layer 103 and the second base substrate 104 may also be disposed on the same layer, or the anti-reflection layer 103 and the second common electrode layer 106 may be disposed on the same layer.

When the anti-reflection layer 103 and the second base substrate 104 are disposed on the same layer, if the second base substrate 104 is made of glass, quartz, and the like, the sulfur-containing material included in the material of the anti-reflection layer 103 may be the sulfur-containing nanoparticles; if the second base substrate 104 is made of polyimide and the like, the sulfur-containing material included in the material of the anti-reflection layer 103 may be the sulfur-containing polymer, such as polyimide having thioether, sulfone, sulfur heterocycle, or other sulfur-containing groups, or the sulfur-containing material included in the material of the anti-reflection layer 103 may also be the sulfur-containing nanoparticles.

When the anti-reflection layer 103 and the second common electrode layer 106 are disposed on the same layer, the sulfur-containing material included in the material of the anti-reflection layer 103 may be the sulfur-containing nanoparticles.

In the embodiment, the anti-reflection layer 103 is disposed between the polarizing layer 105 and the array substrate 101, and the refractive index of the anti-reflection layer 103 is between the refractive indexes of the two film layers adjacent to the anti-reflection layer 103, thereby reducing the reflection of the external light on the display panel 100 and improving the display effect of the display panel 100.

A Second Embodiment

Figure 2:
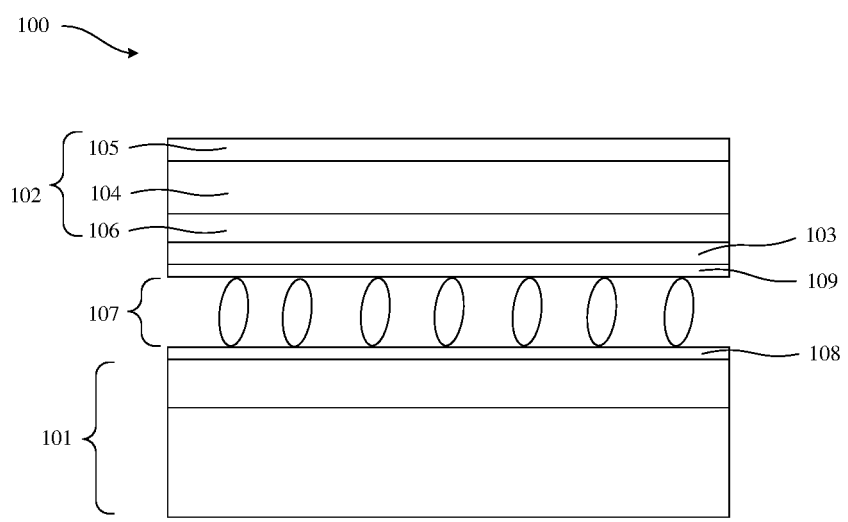
FIG. 2 is a schematic view of a second structure of a display panel of the present disclosure.
Figure 3:
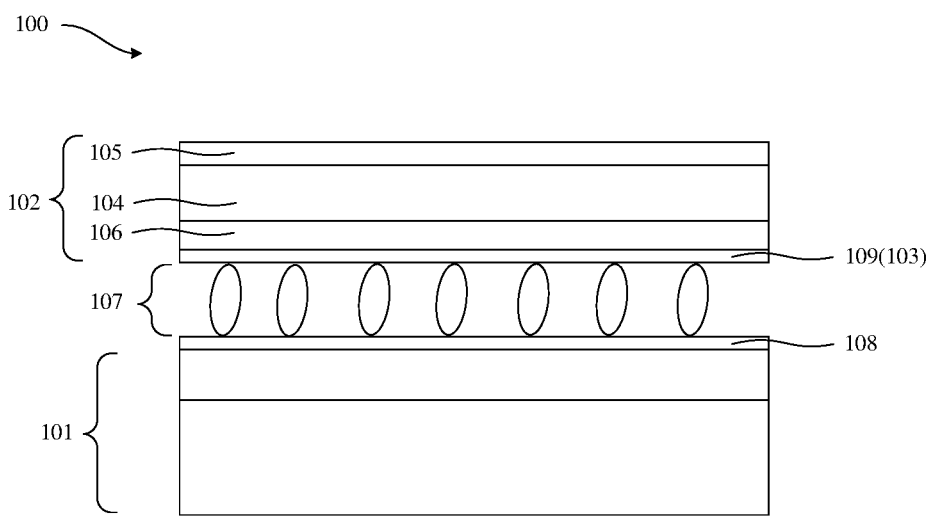
FIG. 3 is a schematic view of a third structure of a display panel of the present disclosure.

Referring to FIG. 2 and FIG. 3, this embodiment is the same as or similar to the first embodiment, and the difference is that:

The display panel 100 further includes a liquid crystal layer 107 located between the array substrate 101 and the second common electrode layer 106, a first alignment layer 108 located on a side of the liquid crystal layer 107 close to the array substrate 101, and a second alignment layer 109 located on a side of the liquid crystal layer 107 close to the second common electrode layer 106.

Moreover, the anti-reflection layer 103 is located in the first alignment layer 108 and/or the second alignment layer 109.

Alternatively, the anti-reflection layer 103 is proximately disposed on at least one side of the first alignment layer 108 and/or the second alignment layer 109.

In the embodiment, the anti-reflection layer 103 and the first alignment layer 108 may be disposed on the same layer, or the anti-reflection layer 103 may also be located between the first alignment layer 108 and the array substrate 101.

In the embodiment, the anti-reflection layer 103 and the second alignment layer 109 may be disposed on the same layer, or the anti-reflection layer 103 may also be located between the second alignment layer 109 and the second common electrode 106.

In the embodiment, a refractive index of the second common electrode layer 106 is from 1.8 to 2.0, a refractive index of the liquid crystal layer 107 is from 1.5 to 1.6, and a refractive index of the second alignment layer 109 that is not disposed on the same layer on which the anti-reflection layer 103 is disposed is also from 1.6 to 1.8.

Therefore, when the anti-reflection layer 103 and the second alignment layer 109 are disposed on the same layer, or the anti-reflection layer 103 located between the second alignment layer 109 and the second common electrode layer 106, the refractive index of the anti-reflection layer 103 is from 1.6 to 1.8.

The inventors found that when the anti-reflection layer 103 and the second alignment layer 109 are disposed on the same layer, the refractive index of the second alignment layer 109 is increased from 1.6 to 1.65, and thus a refractive index of the display panel 100 may be decreased by 1.8%.

When the refractive index of the anti-reflection layer 103 is less than 1.6, the difference of the refractive index between the anti-reflection layer 103 and the second common electrode layer 106 is too large, so that when the external light passes through the second common electrode layer 106 and reaches the anti-reflection layer 103, the external light is apt to be reflected, thus being disadvantageous to reducing the reflection of the external light on the display panel 100. For the same reason, when the refractive index of the anti-reflection layer 103 is greater than 1.8, the difference of the refractive index between the anti-reflection layer 103 and the liquid crystal layer 107 or between the anti-reflection layer 103 and the second alignment layer 109 is too large, so that when the external light passes through the anti-reflection layer 103 and reaches the second alignment layer 109 or the liquid crystal layer 107, the external light is also apt to be reflected, thus being disadvantageous to reducing the reflection of the external light on the display panel 100.

When the refractive index of the anti-reflection layer 103 is constant in a direction from the array substrate 101 to the second common electrode layer 106, the refractive index of the anti-reflection layer 103 is preferably 1.7. Clearly, when the refractive index of the anti-reflection layer 103 is 1.7, the difference of the refractive index between the anti-reflection layer 103 and the second common electrode layer 106, between the anti-reflection layer 103 and the second alignment layer 109, or between the anti-reflection layer 103 and the liquid crystal layer 107 is small, thus being conducive to reducing the reflection of the external light after the external light passes through the second common electrode layer 106 and reaches the anti-reflection layer 103, and reducing the reflection of the external light after the external light passes through the anti-reflection layer 103 and reaches the second alignment layer 109 or the liquid crystal layer 107. Thus, the effect of reducing the reflection of the external light on the display panel 100 is desirable.

In the embodiment, when the anti-reflection layer 103 and the second alignment layer 109 are disposed on the same layer, or the anti-reflection layer 103 is located between the second alignment layer 109 and the second common electrode layer 106, the refractive index of a side of the anti-reflection layer 103 close to the second common electrode layer 106 may be greater than the refractive index of a side of the anti-reflection layer 103 close to the array substrate 101.

In the embodiment, the refractive index of the anti-reflection layer 103 may gradually increase in a direction from the array substrate 101 to the second common electrode 106.

When the anti-reflection layer 103 and the second alignment layer 109 are disposed on the same layer, or the anti-reflection layer 103 is located between the second alignment layer 109 and the second common electrode layer 106, the refractive index of the anti-reflection layer 103 may gradually increase from 1.6 to 1.8 in the direction from the array substrate 101 to the second common electrode.

By means of gradual increase of the refractive index of the anti-reflection layer 103 in the direction from the array substrate 101 to the second common electrode layer, which is conducive to the gradual change of the refractive index of the anti-refraction layer 103, the refractive index of the anti-reflection layer 103 in the direction from the array substrate 101 to the second common electrode layer gradually approximates the refractive index of the second common electrode layer, and the refractive index of the anti-reflection layer 103 in the direction from the second common electrode layer to the array substrate 101 gradually approximates the refractive index of the liquid crystal layer 107 or the second alignment layer 109. Since the refractive index of the anti-reflection layer 103 gradually increases in the direction from the array substrate 101 to the second common electrode layer, the gradual change of the refractive indexes from the second common electrode layer 106 to the liquid crystal layer 107 or the second alignment layer 109 is achieved, thus preventing the great change of the refractive indexes from the second common electrode layer 106 to the liquid crystal layer 107 or the second alignment layer 109, and being conducive to reducing the reflection of the external light on the display panel 100.

When the refractive index of the anti-reflection layer 103 may gradually increase in the direction from the array substrate 101 to the second common electrode 106, density of the sulfur-containing material in the material of the anti-reflection layer 103 gradually increases.

In the embodiment, a mass fraction of the sulfur-containing material in the material of the anti-reflection layer is from 0.5% to 5%.

When the mass fraction of the sulfur-containing material of the anti-reflection layer 103 is less than 0.5%, since content of the sulfur-containing material is too low, it is difficult to increase the refractive index of the anti-reflection layer 103 to a target value, and since the anti-reflection layer 103 and the second alignment layer 109 are disposed on the same layer, or the anti-reflection layer 103 is located between the second alignment layer 109 and the second common electrode layer 106, the refractive index of the anti-reflection layer 103 is required to be 1.6 to 1.8. When the mass fraction of the sulfur-containing material of the anti-reflection layer 103 is greater than 0.5%, since the content of the sulfur-containing material is too high, it is easy to cause the refractive index of the anti-reflection layer 103 to be higher than 1.8, which does not meet the requirement for the refractive index of the anti-reflection layer 103.

In the embodiment, the material of the anti-reflection layer 103 is polyimide doped with the sulfur-containing material.

In the embodiment, the sulfur-containing material may be the sulfur-containing polymer, or may also be the sulfur-containing particles or other sulfur-containing materials that may modulate the refractive index of the anti-reflection layer 103, which are not specifically limited herein.

In the embodiment, by disposing the anti-reflection layer 103 in the first alignment layer 108 and/or the second alignment layer 109, or by disposing the anti-reflection layer 103 to be adjacent to at least one side of the first alignment layer 108 and/or the second alignment layer 109, the refractive index of the anti-reflection layer 103 is between the refractive indexes of the two film layers adjacent to the anti-reflection layer 103, thus reducing the reflection of the external light on the display panel 100 and improving the display effect of the display panel 100. When the anti-reflection layer 103 and the second alignment layer 109 are disposed on the same layer, or the anti-reflection layer 103 is located between the second alignment layer 109 and the second common electrode layer 106, by making the refractive index of the anti-reflection layer 103 be 1.6 to 1.8, the refractive index of the anti-reflection layer 103 is between the refractive indexes of the second common electrode layer 106 and the second alignment layer 109, or is between the refractive indexes of the second common electrode layer 106 and the liquid crystal layer 107, thus reducing the reflection of the external light on the display panel 100 and improving the display effect of the display panel 100.

A Third Embodiment

Figure 4:
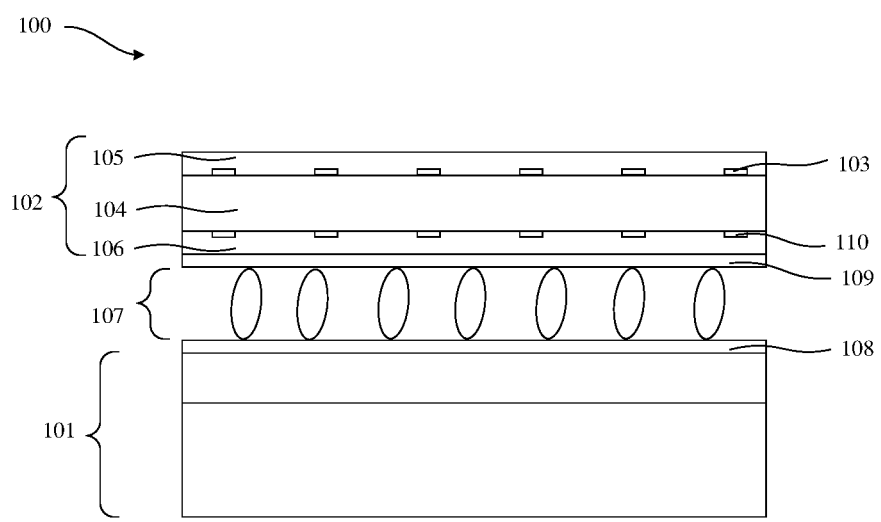
FIG. 4 is a schematic view of a fourth structure of a display panel of the present disclosure.

Referring to FIG. 4, this embodiment is the same as or similar to the first embodiment and the second embodiment, and the difference is that:

The display panel 100 further includes a black matrix 110 located on the array substrate 101 or the optical function layer 102.

Moreover, an orthographic projection of the anti-reflection layer 103 projected on the black matrix 110 is within the black matrix 110.

In the embodiment, since the orthographic projection of the anti-reflection layer 103 projected on the black matrix 110 is located within the black matrix 110, and the reflection of the external light on the display panel 100 is reduced, the effect of the anti-reflection layer 103 on the light emission of the display panel 100 is avoided, and the effect of the display panel 100 is improved.

A Fourth Embodiment

Figure 5:
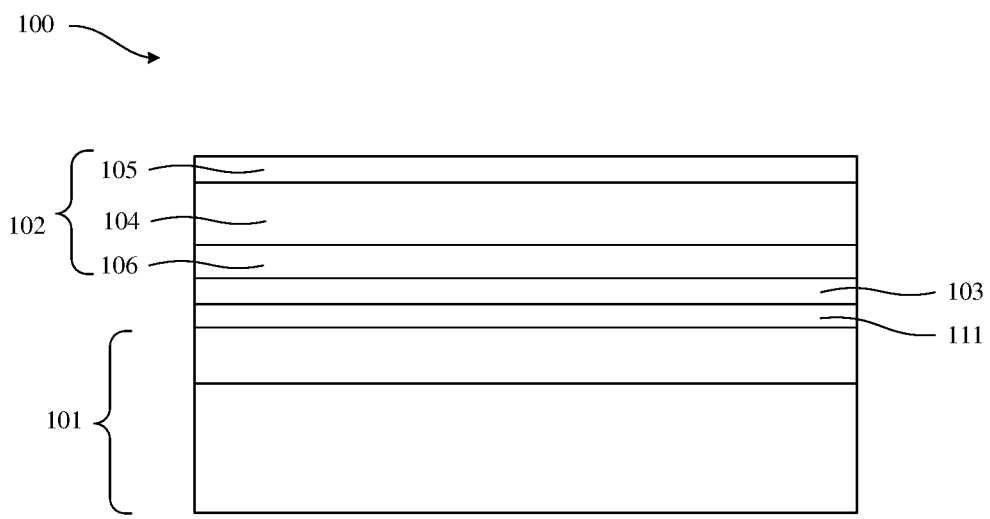
FIG. 5 is a schematic view of a fifth structure of a display panel of the present disclosure.

Referring to FIG. 5, this embodiment is the same as or similar to the above-mentioned embodiments, and the difference is that:

The display panel 100 further includes a light-emitting layer 111 located between the array substrate 101 and the second common electrode layer 106.

Moreover, the anti-reflection layer 103 is located between the light-emitting layer 111 and the second common electrode layer 106.

In the embodiment, the display panel 100 may be OLED display panel.

In the embodiment, the material of the anti-reflection layer 103 is a transparent conductive material.

In the embodiment, the anti-reflection layer 103 is disposed between the light-emitting layer 111 and the second common electrode layer 106, and the refractive index of the anti-reflection layer 103 is between the refractive indexes of the light-emitting layer 111 and the second common electrode layer 106, thus not only reducing the reflection of the light emitted by the light-emitting layer 111 in the display panel 100, but also reducing the reflection of the external light on the display panel 100, which is conducive to improving the display effect of the display panel 100.

In the above-mentioned embodiments, a light transmittance of the anti-reflection layer 103 is greater than or equal to 90%. When the light transmittance of the anti-reflection layer 103 is less than 90%, it is disadvantageous to the transmission of the light emitted by the display panel 100 itself, thus causing the reduction of the light transmittance of the anti-reflection layer 103 and affecting the display effect of the display panel 100. Therefore, the light transmittance of the anti-reflection layer 103 is greater than or equal to 90%.

The present disclosure further provides a display device, and the display device includes the foregoing display panel.

In the embodiment, the specific structure of the display panel 100 included in the display device is specifically illustrated in the description of the above-mentioned display panel, and thus is not redundantly described in detail herein.

In the display device provided by the present disclosure, the anti-reflection layer made of the sulfur-containing material is disposed, and the refractive index of the anti-reflection layer is between the refractive indexes of the two film layers adjacent to the anti-reflection layer, thereby reducing the reflection of the external light on the display panel and improving the display effect of the display panel.

The present disclosure provides a display panel and a display device. The display panel includes the array substrate, the optical function layer, and the anti-reflection layer. The optical function layer and the anti-reflection layer are located on the array substrate, the material of the anti-reflection layer includes the sulfur-containing material, and the refractive index of the anti-reflection layer is between the refractive indexes of the two film layers adjacent to the anti-reflection layer. In the present disclosure, the anti-reflection layer made of the sulfur-containing material is disposed, and the refractive index of the anti-reflection layer is between the refractive indexes of the two film layers adjacent to the anti-reflection layer, thereby reducing the reflection of the external light on the display panel and improving the display effect of the display panel.

It can be understood that for those skilled in the art, equivalent replacements or changes can be made according to the technical solutions of the present disclosure and the inventive concepts thereof, and all of the changes or replacements should belong to the protective scope of the appended claims of the present disclosure.

What is claimed is:

1. A display panel, comprising:
an array substrate,
an optical function layer located on the array substrate, wherein the optical function layer includes a second base substrate, a polarizing layer located on a side of the second base substrate away from the array substrate, and a second common electrode layer located on a side of the second base substrate close to the array substrate;
a liquid crystal layer located between the array substrate and the second common electrode layer;
a first alignment layer located on a side of the liquid crystal layer close to the array substrate;
a second alignment layer located on a side of the liquid crystal layer close to the second common electrode layer; and
an anti-reflection layer, wherein the anti-reflection layer and the first alignment layer are disposed within the same layer, or the anti-reflection layer is located between the first alignment layer and the array substrate,
wherein material of the anti-reflection layer includes a sulfur-containing material; and
wherein a refractive index of the anti-reflection layer is between refractive indexes of two film layers adjacent to the anti-reflection layer.

2. A display panel, comprising:
an array substrate,
an optical function layer located on the array substrate, wherein the optical function layer includes a second base substrate, a polarizing layer located on a side of the second base substrate away from the array substrate, and a second common electrode layer located on a side of the second base substrate close to the array substrate;
a liquid crystal layer located between the array substrate and the second common electrode layer;
a first alignment layer located on a side of the liquid crystal layer close to the array substrate;
a second alignment layer located on a side of the liquid crystal layer close to the second common electrode layer; and
an anti-reflection layer, wherein the anti-reflection layer and the second alignment layer are disposed within the same layer, or the anti-reflection layer is located between the second alignment layer and the second common electrode layer,
wherein material of the anti-reflection layer includes a sulfur-containing material; and
wherein a refractive index of the anti-reflection layer is between refractive indexes of two film layers adjacent to the anti-reflection layer.

3. The display panel according to claim 2, wherein the refractive index of the anti-reflection layer is from 1.6 to 1.8.

4. The display panel according to claim 3, wherein a mass fraction of the sulfur-containing material of the anti-reflection layer is from 0.5% to 5%.

5. The display panel according to claim 3, wherein the material of the anti-reflection layer is polyimide doped with the sulfur-containing material.

6. The display panel according to claim 2, wherein the refractive index of a side of the anti-reflection layer close to the second common electrode layer is greater than the refractive index of a side of the anti-reflection layer close to the array substrate.

7. The display panel according to claim 6, wherein the refractive index of the anti-reflection layer gradually increases in a direction from the array substrate to the second common electrode.

8. The display panel according to claim 2, wherein the display panel further includes a black matrix located on the array substrate or the optical function layer; and
wherein an orthographic projection of the anti-reflection layer projected on the black matrix is within the black matrix.

9. The display panel according to claim 2, wherein the display panel further includes a light-emitting layer located between the array substrate and the second common electrode layer; and
wherein the anti-reflection layer is located between the light-emitting layer and the second common electrode layer.

10. The display panel according to claim 2, wherein the sulfur-containing material includes sulfur-containing nanoparticles.

11. The display panel according to claim 10, wherein the sulfur-containing material is zinc sulfide nanoparticles.

12. The display panel according to claim 2, wherein the sulfur-containing material includes a sulfur-containing polymer.

13. The display panel according to claim 12, wherein the sulfur-containing material is an optical resin having a sulfur-containing group.

14. The display panel according to claim 13, wherein the sulfur-containing group includes at least one of thioether, sulfone, or sulfur heterocycle.

15. A display device, comprising a display panel, wherein the display panel includes:
- an array substrate,
- an optical function layer located on the array substrate, wherein the optical function layer includes a second base substrate, a polarizing layer located on a side of the second base substrate away from the array substrate, and a second common electrode layer located on a side of the second base substrate close to the array substrate;
- a liquid crystal layer located between the array substrate and the second common electrode layer;
- a first alignment layer located on a side of the liquid crystal layer close to the array substrate;
- a second alignment layer located on a side of the liquid crystal layer close to the second common electrode layer; and
- an anti-reflection layer, wherein the anti-reflection layer and the second alignment layer are disposed within the same layer, or the anti-reflection layer is located between the second alignment layer and the second common electrode layer,
- wherein material of the anti-reflection layer includes a sulfur-containing material; and
- wherein a refractive index of the anti-reflection layer is between refractive indexes of two film layers adjacent to the anti-reflection layer.

* * * * *